UNITED STATES PATENT OFFICE.

WILLIAM COLLINS ERLER, OF TERRE HAUTE, INDIANA.

BITUMINOUS COMPOSITION.

1,329,232.      Specification of Letters Patent.      Patented Jan. 27, 1920.

No Drawing.      Application filed May 6, 1919. Serial No. 295,044.

*To all whom it may concern:*

Be it known that I, WILLIAM C. ERLER, a citizen of the United States, and a resident of Terre Haute, in the county of Vigo and State of Indiana, have invented a new and Improved Bituminous Composition, of which the following is a full, clear, and exact description.

My invention relates to a composition of matter particularly suitable for making vessels such as are used in storage batteries and similar articles.

This composition can be produced cheaply and it is not as hard or as brittle as the composition usually employed for making vessels and articles of the type referred to, and, furthermore, a vessel made of this composition can be quickly and cheaply repaired by the application of heat.

The composition consists of four ingredients divided into twenty-one parts by weight into the following proportions:

| | |
|---|---|
| Genasco asphalt | 12 parts |
| Pitch | 6 " |
| Wheat flour | 2 " |
| Cement | 1 " |

These ingredients are mixed in the following order and proportions:

First, mix two parts of wheat flour with one part of cement. Slowly heat twelve parts of asphalt and six parts of pitch separately until warm enough to mix, then add the two together. The mixture is heated until the temperature thereof reaches about five hundred degrees Fahrenheit. By the application of heat the mixture becomes homogeneous, and at this time the above mixture of flour and cement is added and the total mixture is continually stirred to render the resulting product homogeneous. This product is then removed from the mixing vessel and placed on a warm smooth surface and while still hot it is preferably rolled or pressed into a desired form.

Although I prefer to use Genasco asphalt, other asphalt may be used for the purpose.

Having thus described my invention, I claim as new and desire to secure by Letters Patent:—

1. A bituminous composition composed of the following ingredients in approximately the following proportions: asphalt, 12 parts; pitch, 6 parts; flour, 2 parts; and cement, 1 part.

2. A bituminous composition composed of the following ingredients in approximately the following proportions: Genasco asphalt, 12 parts; pitch, 6 parts; wheat flour, 2 parts; and cement, 1 part.

WILLIAM COLLINS ERLER.